UNITED STATES PATENT OFFICE.

PRIMO CALOVI, OF NEW YORK, N. Y., ASSIGNOR, BY MESNE ASSIGNMENTS, TO HOLDZEM COMPANY, INC., OF NEW YORK, N. Y., A CORPORATION OF NEW YORK.

COMPOSITION OF MATTER AND PROCESS OF PRODUCING THE SAME.

1,386,922.   Specification of Letters Patent.   Patented Aug. 9, 1921.

No Drawing.   Application filed May 6, 1920.   Serial No. 379,307.

*To all whom it may concern:*

Be it known that I, PRIMO CALOVI, a subject of the King of Great Britain, residing at New York, in the county of New York and State of New York, have invented certain new and useful Improvements in Composition of Matter and Processes of Producing the Same; and I do hereby declare the following to be a full, clear, and exact description of the invention, such as will enable others skilled in the art to which it appertains to make and use the same.

This invention relates to a composition of matter, and process of producing the same, and has for its object to improve the articles and procedures of this nature which have been heretofore proposed.

With this and other objects in view the invention consists in the novel product constituting the composition of matter and in the novel procedure constituting the process all as will be more fully hereinafter disclosed and particularly pointed out in the claims.

The product resulting from this process is a pliable, gummy, resilient, strong and very sticky substance, soft enough for rats, mice, and other vermin to become mired therein, and is strong enough to hold even a dog or a cat.

In carrying out the invention I take 100 kilos of raw linseed oil and heat the same in a copper pot or boiler until a red foam appears and ceases. This required about 45 minutes, and the oil then begins under a continued heating to give off a heavy smoke like vapor, and fine white bubbles. When the latter appear, care must be taken to reduce the temperature to such a degree that large bubbles are not produced. Should large bubbles appear, or if the oil begins to boil over, the oil is liable to catch fire and burn up. For such contingencies, a cover for the pot should be kept ready at hand, and when violent boiling begins, it is well to put out the fire entirely. The temperature of the oil is so regulated that the small bubbles are given off for a period of from 8 to 13 hours according to the quality of the oil, and about from 3 to 5 hours after such bubbles begin a red foam will appear a second time on top of the oil. When this said red foam becomes pronounced, it is best to reduce the temperature, whereupon the oil will thicken to such an extent that it will occasionally puff up into balloon like bubbles which will break, and it will take on a rubber-like consistency. Said oil will now soon form a transparent skin, or hide like layer on its surface, through which the small white bubbles may be seen as the heating continues. The temperature is now so regulated as to keep these bubbles bursting, but not high enough to form larger ones.

At this time or toward the end of the operation, a small stick is thrust down into the mass of oil, from time to time, or say about every 10 or 15 minutes and then withdrawn, until the mass fails to adhere to the stick. When this occurs, the pot is removed from the fire and the boiling operation is completed.

On the other hand, if when inserting said stick into the mass, it is found that an agitation of its immersed end will cause some of the mass to turn back to the liquid state, then the heating has not been carried out properly and the whole mass should be stirred until it all turns back to oil, whereupon it may be used over again, in a subsequent operation.

After the heated mass of oil has reached such a consistency that it will not adhere to a wooden stick, and after the heating has ceased, the mass should be stirred with a wooden paddle from 15 to 45 minutes, or until it is converted into reddish lumps having little adherence to each other. The mass is now placed in a suitable mixing apparatus and from 7 to 10 kilos of water are gradually added to the original 100 kilos of material. The actual amount of water will depend upon the quickness with which the reddish lumps appeared under the stirring operation. If this brick red color appeared after say 15 minutes of stirring, then one would add 10 kilos of water, while if said color took longer to appear, one would add a correspondingly less quantity of water. The mass is now stirred until all the lumps are dissolved.

It is an important feature of this invention, that this water is added to the finally cooked mass, for without it the requisite strength of the final product cannot be obtained.

About 2 or 3 kilos of the solution thus obtained is now taken from the mixer and placed in a copper kettle, whereupon heat is applied and a quantity of rosin between 8 and 20 kilos, but preferably about 15 kilos, is at the same time added to said kettle. The heating is continued and the rosin mixture stirred until a complete rosin solution is had. The kettle is now removed from the fire, and about one third or six kilos of this rosin solution is poured back into the mixer while the latter is running and when the material therein is at a temperature sufficiently low to not burn the hand. The two additional quantities of say one third each of the rosin solution are next added at intervals of from 4 or 5 minutes, whereupon the mixer is run for about 20 minutes longer or until a homogeneous mass is had, when the mixer is stopped, the mass spread out on a table 4 or 5 inches deep and left until it cools, whereupon it may be placed in suitable containers for the market.

The product thus produced as above stated will be so strong that it will hold rats of the largest size, and even dogs and cats. In use, the material is spread in the path of the animal to be caught, and of a thickness sufficient for his feet to sink or mire into the same, whereupon, he will be held in place, in spite of all efforts to escape.

It is an important feature of this invention that the heating and mixing of the ingredients be carried out as described, for should the mass be merely heated to a rubber like consistency without observing the precautions set forth, or if the rosin be added while the oil is still very hot and sticky without going through the mixing operations outlined, the mass will turn back into the liquid form, and will be filled with lumps of burnt oil and will possess little strength.

It is further important that the rosin does not exceed say 20 per cent of the whole, for a greater amount lessens the strength of the product as well as the adding of said rosin to a hot mixture. It is also important to keep the hands well oiled or greased when handling this product, for it sticks so tenaciously it is difficult, otherwise, to remove it. It is desirable to never fill the pot more than ⅔ full, for otherwise it is liable to boil over and catch fire.

It is still further important that the original raw oil should be allowed to settle for say three or four days before beginning to boil it, and that then it should be drawn off from a point say four or five inches from the bottom of the barrel, so as to avoid all sediment entering the boiler, otherwise the finished product is apt to be lumpy and of an inferior quality. Futhermore, after the pot has been removed from the fire, the second time, the surface of the oil will have lowered about two or three inches, leaving a crust around the inside of the pot. This crust as well as the above mentioned skin or hide should be removed and not mixed in with the oil.

It is obvious that those skilled in the art may vary the details of the procedure without departing from the spirit of the invention, and therefore, I do not wish to be limited to the above disclosure except as may be required by the claims.

What I claim is:

1. The process of producing a gum like mass suitable for catching vermin which consist in heating linseed oil until it does not adhere to wood; mixing water with said mass; mixing less than 20 per cent. of rosin with said mass; and stirring the material until a tenacious, resilient and adhering substance results, substantially as described.

2. The process of producing a gum like mass suitable for catching vermin which consists in heating raw linseed oil until it does not adhere to wood; mixing more than 5 per cent. of water with said mass; mixing less than 20 per cent. of rosin with said mass at a temperature too low to burn the hand; and stirring the material until a tenacious, resilient and adhering substance results, substantially as described.

3. The herein described new composition of matter suitable for catching rats, comprising a mass of cooked linseed oil admixed with water, and having rosin dissolved therein, the whole constituting a tenacious, sticky, resilient, gum-like mass of a strength sufficient to hold rats of large size, substantially as described.

4. The herein described new composition of matter suitable for catching rats comprising a mass of cooked linseed oil, admixed with water, and having less than 20 per cent. of rosin dissolved therein, the whole constituting a tenacious, sticky, resilient, gum-like mass of a strength sufficient to hold rats of the largest size, substantially as described.

5. The herein described new composition of matter suitable for catching rats comprising a mass of cooked linseed oil admixed with substantially ten per cent. of water and 15 per cent. of rosin, the whole constituting a tenacious, sticky, resilient, gum-like mass of a strength sufficient to hold rats of the largest size, substantially as described.

In testimony whereof I affix my signature.

PRIMO CALOVI.